(12) United States Patent
Mao et al.

(10) Patent No.: US 10,690,960 B2
(45) Date of Patent: Jun. 23, 2020

(54) DISPLAY DEVICE

(71) Applicant: InnoLux Corporation, Miao-Li County (TW)

(72) Inventors: Li-Wei Mao, Miao-Li County (TW); Ming-Chia Shih, Miao-Li County (TW); Chih-Chang Chen, Miao-Li County (TW); Chung-Kuang Wei, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 123 days.

(21) Appl. No.: 15/707,388

(22) Filed: Sep. 18, 2017

(65) Prior Publication Data

US 2018/0107063 A1 Apr. 19, 2018

Related U.S. Application Data

(60) Provisional application No. 62/416,679, filed on Nov. 2, 2016, provisional application No. 62/408,871, filed on Oct. 17, 2016.

(30) Foreign Application Priority Data

Jul. 5, 2017 (CN) .......................... 2017 1 0541920

(51) Int. Cl.
  *G02F 1/13357* (2006.01)
  *G02F 1/1335* (2006.01)
(52) U.S. Cl.
  CPC .. *G02F 1/133602* (2013.01); *G02F 1/133504* (2013.01); *G02F 1/133611* (2013.01); *G02F 2201/56* (2013.01)

(58) Field of Classification Search
  CPC .......... G02F 1/1336; G02F 1/133606–133613
  See application file for complete search history.

(56) References Cited

U.S. PATENT DOCUMENTS

| | | | | |
|---|---|---|---|---|
| 6,008,784 A | * | 12/1999 | Acres | G09F 9/33 345/55 |
| 2015/0022752 A1 | * | 1/2015 | Yeh | G02F 1/133615 349/58 |
| 2015/0036077 A1 | * | 2/2015 | Lee | G02B 6/0081 349/65 |
| 2015/0253493 A1 | * | 9/2015 | Tsai | G02B 6/0045 349/58 |
| 2016/0077328 A1 | * | 3/2016 | Chong | G02B 26/02 349/62 |
| 2017/0200706 A1 | * | 7/2017 | Lee | H01L 25/0753 |

FOREIGN PATENT DOCUMENTS

| | | |
|---|---|---|
| CN | 202691902 U | 1/2013 |
| JP | 2007-317423 A | 12/2007 |

* cited by examiner

*Primary Examiner* — Dung T Nguyen
(74) *Attorney, Agent, or Firm* — McClure, Qualey & Rodack, LLP

(57) ABSTRACT

A display device is provided, which includes a display unit and a backlight module. The backlight module is disposed corresponding to the display unit. The backlight module includes a circuit board, a plurality of light sources, a diffuser plate and an optical film. The light sources are disposed on the circuit board, the diffuser plate is disposed between the light sources and the display unit, and the optical film is disposed between the diffuser plate and the display unit. The optical film includes a micro-structure, and the micro-structure faces the light sources.

6 Claims, 10 Drawing Sheets

DISPLAY DEVICE

CROSS REFERENCE TO RELATED APPLICATIONS

This application claims benefit of U.S. Provisional Application No. 62/408,871 filed Oct. 17, 2016, U.S. Provisional Application No. 62/416,679 filed Nov. 2, 2016, and China Patent Application No. 201710541920.8, filed Jul. 5, 2017, the entirety of which is incorporated by reference herein.

BACKGROUND OF THE DISCLOSURE

Field of the Disclosure

The present disclosure relates to a display device, and more particularly to a display device using the structural design of the backlight module to increase viewing angle or brightness.

Description of the Related Art

An electronic display device is an optoelectronic device capable of transforming electronic signals into a visible image, so as to allow a user to view the information that has been transformed from electronic signals. Recently, electronic display devices such as liquid-crystal displays (LCD) and organic electro luminescence displays have become popular.

In recent years, curved display devices as well as those with non-rectangular shapes have found application in various fields. For example, the dashboard of a car can be designed with a non-rectangular shaped structure so as to enhance its aesthetic appearance.

However, in contrast to conventional flat panel display devices, a curved or non-rectangular display device may have problems such as a small viewing angle, insufficient brightness, or non-uniform brightness.

Consequently, how to design a display device with large viewing angle, sufficient brightness or uniform brightness is an important subject.

BRIEF SUMMARY OF THE DISCLOSURE

As a result, the disclosure provides a display device to solve the aforementioned problem.

In one embodiment, the disclosure provides a display device which includes a display unit and a backlight module. The backlight module is disposed corresponding to the display unit. The backlight module includes a circuit board, a plurality of light sources, a diffuser plate and an optical film. The plurality of light sources is disposed on the circuit board. The diffuser plate is disposed between the light sources and the display unit, and the optical film is disposed between the diffuser plate and the display unit. The optical film includes a micro-structure, and the micro-structure faces the light sources.

In some embodiments, the disclosure further provides a display device, which includes a display unit and a backlight module. The backlight module is disposed corresponding to the display unit. The backlight module includes a circuit board, a plurality of light sources, a first diffuser plate and a second diffuser plate. The light sources are disposed on the circuit board, the first diffuser plate is disposed between the light sources and the display unit, and the second diffuser plate is disposed between the first diffuser plate and the display unit. The circuit board includes at least one radius of curvature, and the radius of curvature ranges from 10 mm to 10000 mm.

In some embodiments, the disclosure further provides a display device, which includes a display unit and a backlight module. The backlight module is disposed corresponding to the display unit. The backlight module includes a plurality of light emitting units and a plurality of edge units. At least one of the light emitting units has a first circuit block and a first light source group, the first light source group includes a plurality of first light sources, and at least a portion of the first light sources is disposed corresponding to the first circuit block. At least one of the edge units has a second circuit block and an edge portion, the edge portion is adjacent to the second circuit block, and the second circuit block is disposed between the edge portion and the first circuit block. The shape of the second circuit block is different from the shape of the first circuit block.

In the embodiments of the disclosure, the display device can be a flat panel display, a curved display device or a display device with an irregularly shaped structure (such as a non-rectangular shaped structure). Based on the arrangement of different optical films or the arrangement of the light sources disposed on the circuit board with the irregularly shaped structure, the viewing angle of the display device can be increased, the brightness of the display device can be stronger, or the phenomenon of non-uniform brightness can be prevented from occurring.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
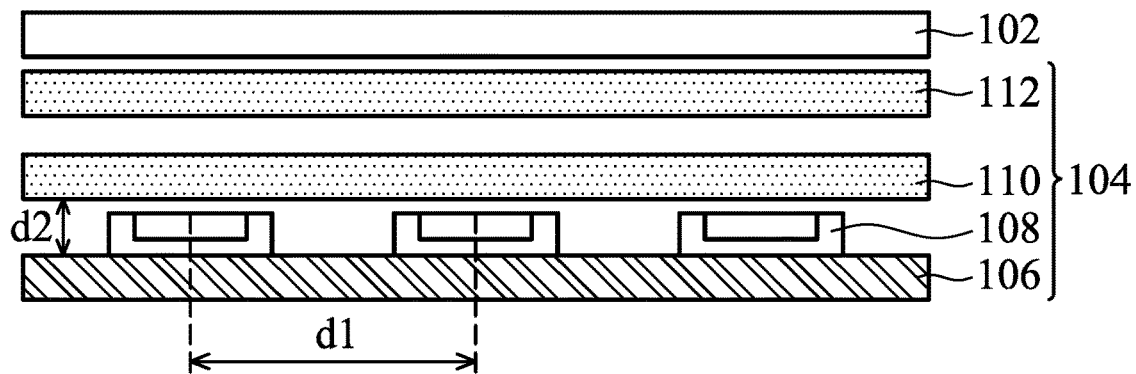
FIG. 1 is a diagram of a display device according to the first embodiment of the disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

The First Embodiment

Please refer to FIG. 1, which is a diagram of a display device 100 according to the first embodiment of the disclosure. In this embodiment, the display device 100 can be a direct-lit curved display device. The display device 100 includes a display unit 102 and a backlight module 104. The display unit 102 can include two substrates (such as a rigid substrate, a glass substrate, a flexible substrate, substrates made of other materials, and a combination thereof), a display layer (such as a liquid-crystal layer or other display layers) and a driving circuit layer (not shown in the figures), and so on. In other embodiments, the display unit 102 can selectively include a color filter disposed between two substrates, but it is not limited thereto. The display layer is disposed between the two substrates, and the driving circuit layer can include a plurality of thin-film transistor (TFT). The color filter can, for example, include a red filter portion, a green filter portion, or a blue filter portion. In other embodiments, the color filter can also be formed of other materials with light-conversion properties, such as a quantum dot material, a fluorescent material, a phosphor material, or a combination thereof, but it is not limited thereto.

The backlight module 104 can be disposed corresponding to the display unit 102. In particular, the backlight module 104 can be disposed below the display unit 102. In this embodiment, the backlight module 104 can include a circuit board 106, a plurality of light sources 108, a first diffuser plate 110 and a second diffuser plate 112. The light sources 108 can be disposed on the circuit board 106. In one embodiment of the disclosure, the light sources 108 can include a quantum dot (QD) material, a fluorescent material, a phosphor material, a light-emitting diode (LED), a micro light-emitting diode (micro LED), other light sources or a combination thereof, but it is not limited thereto. The first diffuser plate 110 can be disposed between the light sources 108 and the display unit 102, and the second diffuser plate 112 can be disposed between the first diffuser plate 110 and the display unit 102. The arrangement of the first diffuser plate 110 and the second diffuser plate 112 can increase the viewing angle of the display device 100, can increase the brightness of the display device 100, or can prevent the phenomenon of non-uniform brightness from occurring.

In this embodiment, the display device 100 is a curved display device. Although the circuit board 106, the first diffuser plate 110, the second diffuser plate 112 and the display unit 102 are illustrated in FIG. 1 as a planar structure, those structures are actually curved because only a portion of the display device 100 is illustrated in FIG. 1. The circuit board 106 includes at least one radius of curvature, and the radius of curvature ranges from 10 mm to 10000 mm. In other embodiments, the at least one radius of curvature ranges from 50 mm to 7000 mm.

In addition, a distance between two adjacent light sources 108 is defined as a first distance d1, and a distance between the first diffuser plate 110 and the circuit board 106 is defined as a second distance d2. Specifically, on a cross-section perpendicular to an upper surface of the circuit board 106, the first distance d1 can be the distance between the centers of two adjacent light sources 108 (as illustrated in FIG. 1), or the distance between the same sides of the two adjacent light sources 108 (such as two left sides of the two light sources 108 or two right sides of the two light sources 108). The second distance d2 can be the distance between a lower surface of the first diffuser plate 110 and the upper surface of the circuit board 106 (as illustrated in FIG. 1). In this embodiment, the ratio of the first distance d1 to the second distance d2 is configured to be 15:10. In another embodiment, the backlight module 104 can further include a dot printing layer (not shown in the figures) disposed on the lower surface of the first diffuser plate 110. At this time, the second distance d2 can be configured to be the distance between the lower surface of the first diffuser plate 110 having the dot printing layer and the upper surface of the circuit board 106, and the ratio of the first distance d1 to the second distance d2 can be designed to be 25:10.

In addition, it should be noted that no lens structure can be disposed between the first diffuser plate 110 and the circuit board 106 in the backlight module 104. For example, a conventional display device includes a second lens disposed on the surface of the light-emitting diode. However, in the curved display device, the second lens is usually not able to be stably fixed on the circuit board, and easily causes the problem of non-uniform brightness. Therefore, in this embodiment, at least one light source 108 can have no second lens. For example, no second lens is disposed on all of the light sources 108, or only a part of the light sources 108 have the second lenses, but it is not limited thereto.

The Second Embodiment

Figure 2:
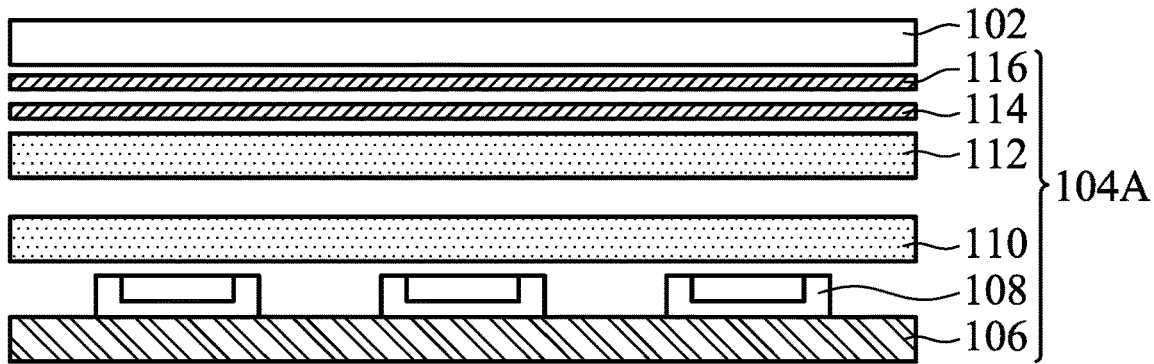
FIG. 2 is a diagram of a display device according to the second embodiment of the disclosure.

Please refer to FIG. 2, which is a diagram of a display device 100A according to the second embodiment of the disclosure. In contrast to the first embodiment, a backlight module 104A of the display device 100A further includes a first optical film 114 and a second optical film 116. The first optical film 114 can be disposed between the second diffuser plate 112 and the display unit 102, and the second optical film 116 can be disposed between the first optical film 114 and the display unit 102. The first optical film 114 can be a diffuser film, and the second optical film 116 can be a diffuser film or a dual brightness enhancement film. The brightness of the display device 100A is more uniform due to the configuration of the first optical film 114 and the second optical film 116.

The Third Embodiment

Figure 3:
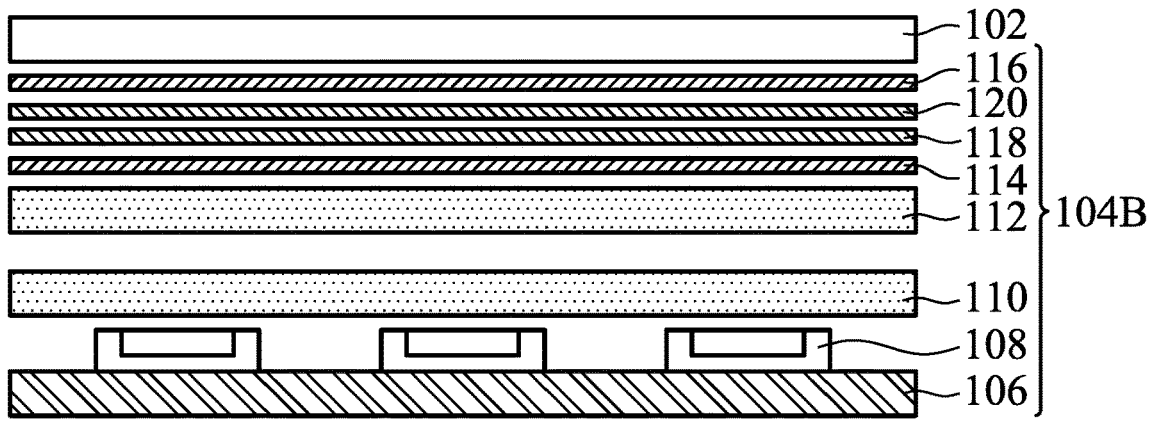
FIG. 3 is a diagram of a display device according to the third embodiment of the disclosure.

Please refer to FIG. 3, which is a diagram of a display device 100B according to the third embodiment of the disclosure. In contrast to the second embodiment, a backlight module 104B of the display device 100B further includes a first brightness enhancement film 118 and a second brightness enhancement film 120. The first brightness enhancement film 118 can be disposed between the first optical film 114 and the second optical film 116, and the second brightness enhancement film 120 can be disposed between the first brightness enhancement film 118 and the second optical film 116. The brightness of the display device 100B can be further increased due to the configuration of the first brightness enhancement film 118 and the second brightness enhancement film 120.

The Fourth Embodiment

Figure 4:
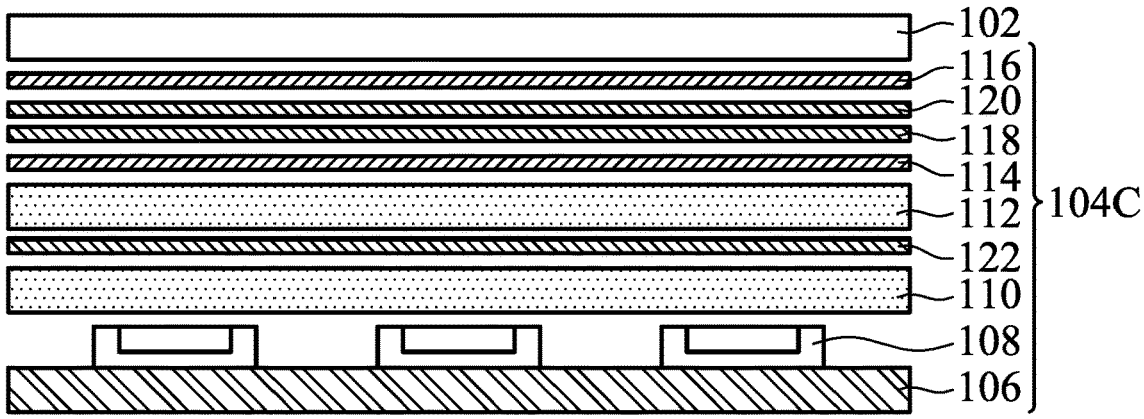
FIG. 4 is a diagram of a display device according to the fourth embodiment of the disclosure.

Please refer to FIG. 4, which is a diagram of a display device 100C according to the fourth embodiment of the disclosure. In contrast to the third embodiment, a backlight module 104C of the display device 100C further includes a third brightness enhancement film 122. The third brightness enhancement film 122 is disposed between the first diffuser plate 110 and the second diffuser plate 112. In this embodiment, the brightness of the display device 100C can be increased due to the configuration of the first brightness enhancement film 118 and the second brightness enhancement film 120, and the brightness of the display device 100C is more uniform due to the configuration of the third brightness enhancement film 122.

The Fifth Embodiment

Figure 5:
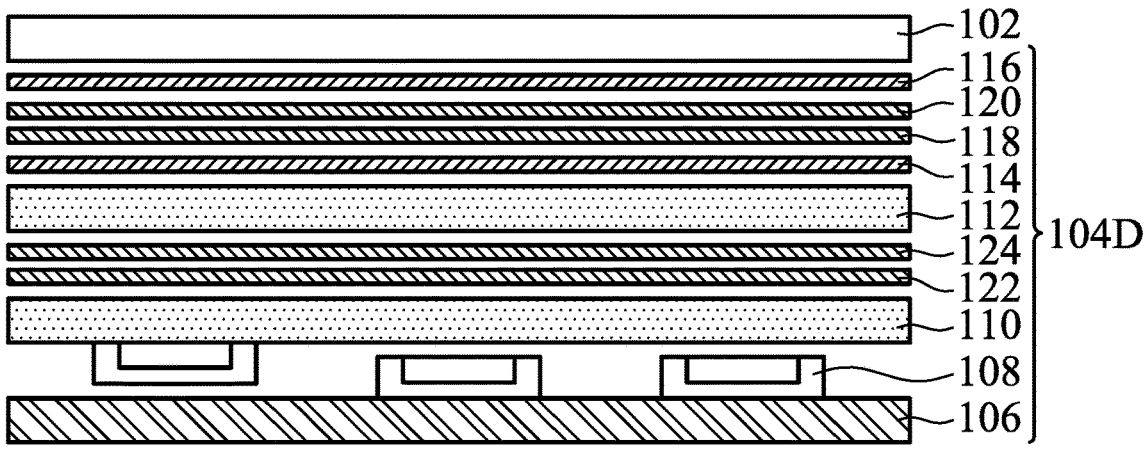
FIG. 5 is a diagram of a display device according to the fifth embodiment of the disclosure.

Please refer to FIG. 5, which is a diagram of a display device 100D according to the fifth embodiment of the disclosure. In contrast to the fourth embodiment, a backlight module 104D of the display device 100D further includes a fourth brightness enhancement film 124. The fourth brightness enhancement film 124 is disposed between the third brightness enhancement film 122 and the second diffuser plate 112. In this embodiment, the brightness of the display device 100D can be increased due to the configuration of the first brightness enhancement film 118 and the second brightness enhancement film 120, and the brightness of the display device 100D is more uniform due to the configuration of the third brightness enhancement film 122 and the fourth brightness enhancement film 124.

The Sixth Embodiment

Figure 6:
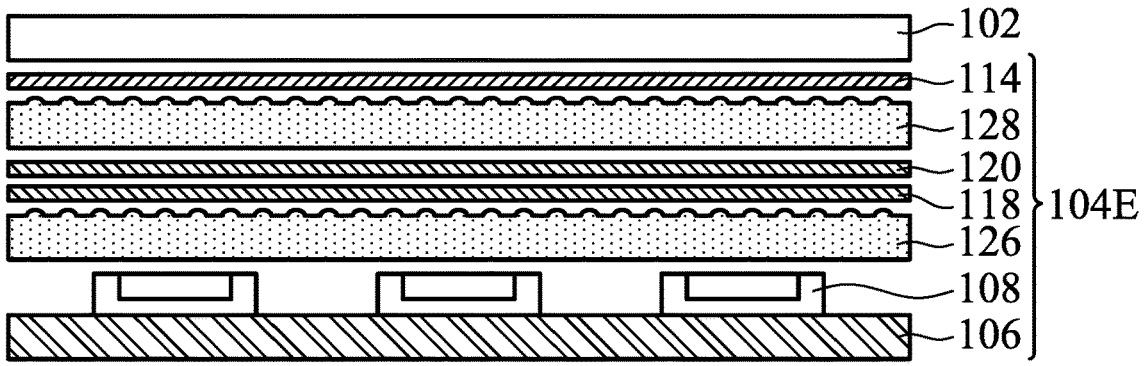
FIG. 6 is a diagram of a display device according to the sixth embodiment of the disclosure.

Please refer to FIG. 6, which is a diagram of a display device 100E according to the sixth embodiment of the disclosure. In this embodiment, at least one of the first diffuser plate 110 and the second diffuser plate 112 can be replaced by a micro-lens diffuser plate. In this embodiment, a backlight module 104E of the display device 100E includes the circuit board 106, the light sources 108, the first optical film 114, the first brightness enhancement film 118, the second brightness enhancement film 120, a first micro-lens diffuser plate 126 and a second micro-lens diffuser plate 128. The first brightness enhancement film 118 is disposed between the first micro-lens diffuser plate 126 and the second micro-lens diffuser plate 128, the second brightness enhancement film 120 is disposed between the first brightness enhancement film 118 and the second micro-lens diffuser plate 128, and the first optical film 114 is disposed between the second micro-lens diffuser plate 128 and the display unit 102. The brightness and image of the display device 100E can be more uniform due to the configuration of the first micro-lens diffuser plate 126 and the second micro-lens diffuser plate 128.

It should be noted that the first diffuser plate 110 and the second diffuser plate 112 in the first to fifth embodiments can also respectively be replaced by the first micro-lens diffuser plate 126 and the second micro-lens diffuser plate 128. Furthermore, one of the first diffuser plate 110 and the second diffuser plate 112 can be replaced by the micro-lens diffuser plate. The structural configuration of the backlight module can be modified according to the design requirements.

Figure 7A:
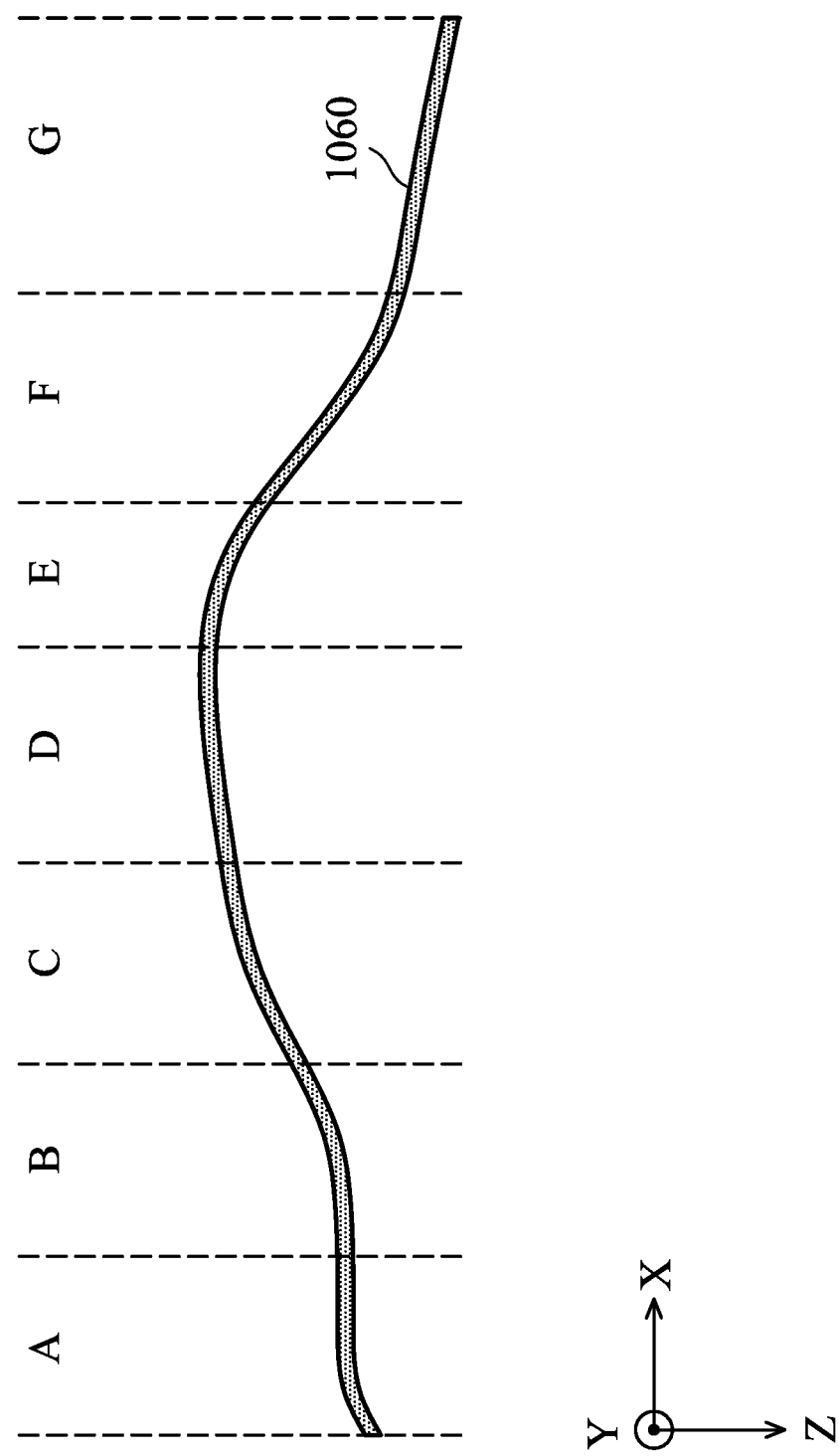
FIG. 7A is a diagram of the circuit board viewed along the Y axis according to any embodiment of the disclosure.
Figure 7B:
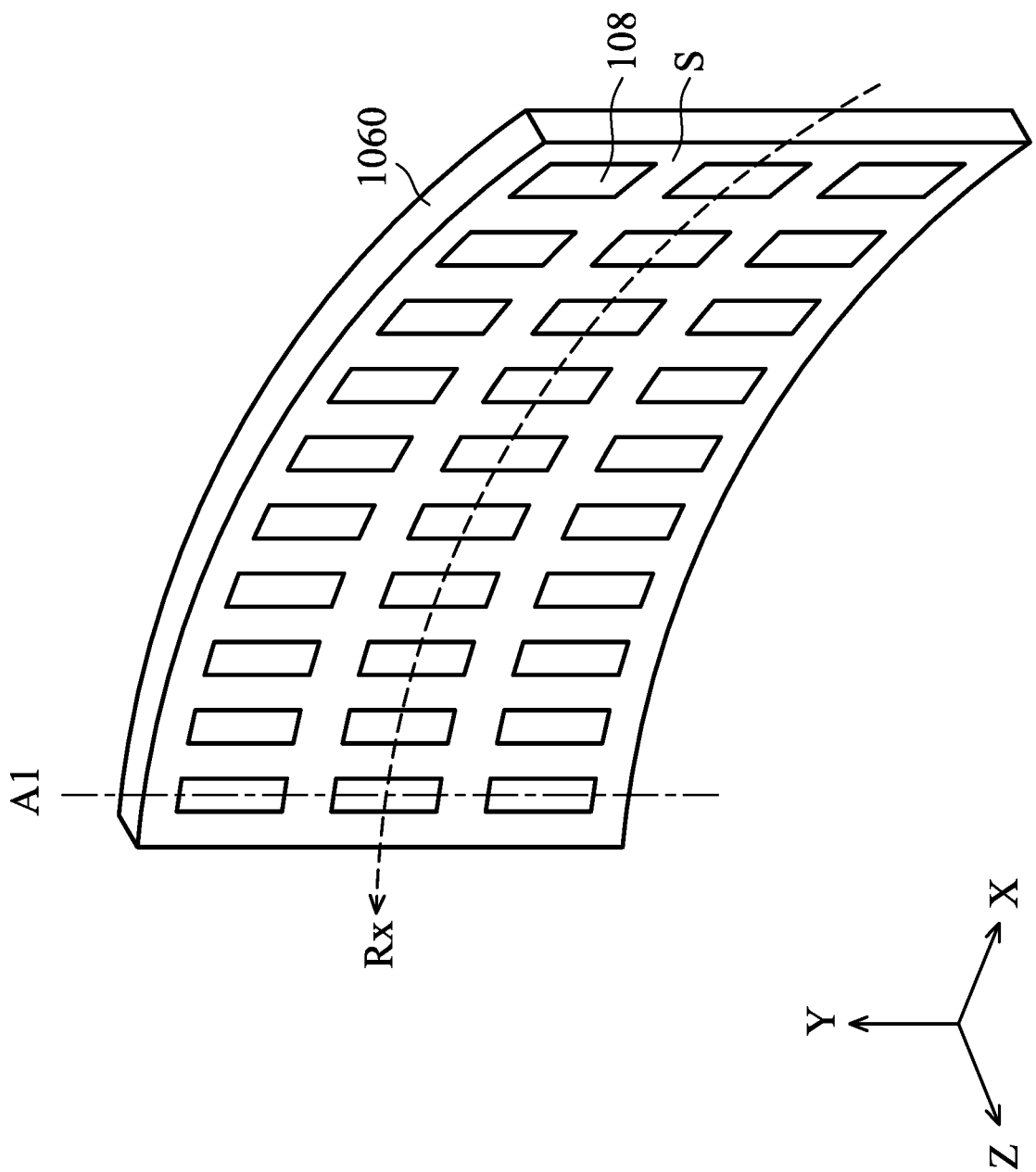
FIG. 7B is a partial diagram of the circuit board according to any embodiment of the disclosure.

Please refer to FIG. 7A and FIG. 7B. FIG. 7A is a diagram of the circuit board viewed along the Y axis according to any embodiment of the disclosure, and FIG. 7B is a partial diagram of the circuit board according to any embodiment of the disclosure. As shown in FIG. 7A, when viewed along the Y axis, a circuit board 1060 can be an irregularly shaped structure and can have at least one radius of curvature, which ranges from 10 mm to 10000 mm or ranges from 50 mm to 7000 mm. For example, the circuit board 1060 includes regions A to G, and the region A, the region B, the region C, the region E and the region F can have different radii of curvature. The region D and the region G can be substantially a plane, and there can be an inflection point in the region B and the region C, or in the region E and the region F, but it is not limited thereto. In other embodiments, the circuit board 1060 can have other shapes and other radii of curvature according to the design requirements. FIG. 7B is a partial enlarged diagram of the region E of the circuit board 1060. The light source 108 can have a rectangular structure, the circuit board 1060 can have a curved surface S, and the light source 108 can be disposed on the curved surface S. The curved surface S can be a surface close to the display unit 102, but it is not limited thereto. Specifically, the rectangular structure of the light source 108 can define a long side direction A1, and the curved surface S can define an extending line Rx. The long side direction A1 of the rectangular structure is substantially perpendicular to the extending line Rx of the curved surface S. That is, the included angle between the long side direction A1 and the extending line Rx is in a range from about 85 degrees to 95 degrees. However, the arrangement of the light sources 108 on the curved surface S is not limited to this embodiment. For example, the long side direction A1 of the light source 108 can be parallel to the extending line Rx of the curved surface S. In other embodiments, when the light source 108 is not a rectangular structure, the long side direction A1 may be a direction along a longitudinal axis (such as Y axis in FIG. 7B) of the light source 108. In this embodiment, "extending line Rx" could be a virtual line along the curved surface S (as shown in FIG. 7B) perpendicular to a bending axis (such as along Y axis in FIG. 7B) of the circuit board 1060 from plan view (such as viewing along Z axis in FIG. 7B). In one embodiment, "perpendicular to the extending line" or "parallel to the extending line" may be perpendicular to a projection of the extending line on the circuit board 1060 onto the XY plane in plan view (such as viewing along Z axis in FIG. 7B) or parallel to a projection of the extending line on the circuit board 1060 onto the XY plane in plan view (such as viewing along Z axis in FIG. 7B).

Figure 8:
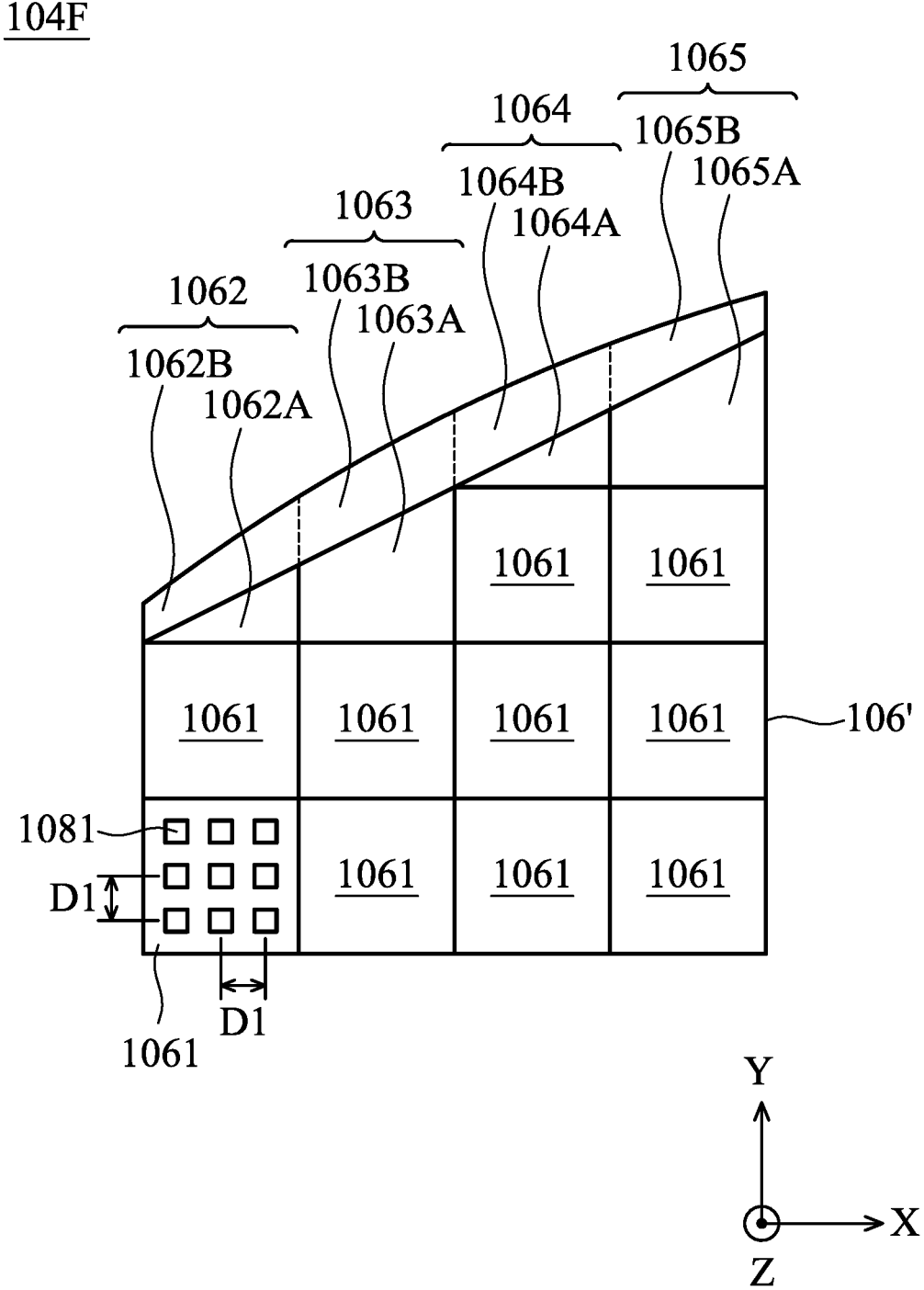
FIG. 8 is a diagram of a backlight module according to an embodiment of the disclosure.

Please refer to FIG. 8, which is a diagram of a backlight module 104F according to an embodiment of the disclosure. The backlight module 104F includes a circuit board 106', and the circuit board 106' can be defined by and composed of a plurality of light emitting units and a plurality of edge units. The light emitting units are arranged in a matrix, and at least one of the light emitting units can include a first circuit block 1061. In one embodiment, each of the light emitting units can include a first circuit block 1061. In one embodiment, the circuit board 106' is composed of ten first circuit blocks 1061 with the same shape and four edge units 1062, 1063, 1064 and 1065. The first circuit blocks 1061 can have the same size and the same shape, and are, for example, arranged in a matrix, but it is not limited to this disclosure. In other embodiments, the first circuit blocks 1061 can have different sizes and different shaped, and can be arranged according to the design requirements. At least one of the edge units can has a second circuit block and an edge portion. In one embodiment, each of the edge units can has a second circuit block and an edge portion. For example, the edge unit 1062 can have a second circuit block 1062A and an edge portion 1062B, the edge unit 1063 can have a second circuit block 1063A and an edge portion 1063B, the edge unit 1064 can have a second circuit block 1064A and an edge portion 1064B, and the edge unit 1065 can have a second circuit block 1065A and an edge portion 1065B. The edge portions 1062B to 1065B can be adjacent to the second circuit blocks 1062A to 1065A, and the second circuit blocks 1062A to 1065A can be respectively disposed between the edge portions and the first circuit blocks 1061. In an embodiment. The shapes of the second circuit blocks 1062A to 1065A are different from the shapes of the first circuit blocks 1061. In this embodiment, the first circuit blocks 1061 and the second circuit blocks 1062A to 1065A can substantially correspond to a display area of the display unit 102, and the edge portions 1062B to 1065B can substantially correspond to a peripheral area of the display unit 102, and the peripheral area surrounds the display area, but it is not limited thereto.

Furthermore, the light emitting units can further include a first light source group which includes a plurality of first light sources 1081, and at least one portion of the first light sources 1081 are disposed corresponding to the first circuit block 1061. In this embodiment, the first light source group can include nine first light sources 1081 disposed on the corresponding first circuit block 1061. A spacing between two adjacent first light sources 1081 is defined as a first spacing D1, and the first spacing D1 is a constant value. The first spacing D1 can be the distance between the centers of two adjacent first light sources 1081 (as illustrated in FIG. 8), or the distance between the same sides of the two adjacent first light sources 1081 (such as two left sides of the two first light sources 1081 or two right sides of the two first light sources 1081). In other embodiments, the first light source group can only include one first light source 1081, but the number of the first light sources 1081 is not limited to those embodiments. In one embodiment, the plurality of first light sources 1081 of the first light source group can be connected to each other in series to output through the same channel and can be electrically connected to a converter. Therefore, the plurality of first light sources 1081 of the first light source group can be driven together. For example, the first light sources 1081 becomes bright or dark at the same time, but it is not limited thereto. Furthermore, the backlight module 104F can include a plurality of blocking walls protruding along the Z axis (not shown in the figures), and the blocking walls are disposed between the light emitting units. For example, the blocking wall is disposed on the boundary between two adjacent first circuit blocks 1061. The blocking wall is configured to concentrate the light emitted from the first light sources 1081 of the corresponding first circuit block 1061 within the area of the first circuit block 1061. In addition, the blocking wall can also be disposed between the first circuit block 1061 and the second circuit block.

Figure 9:
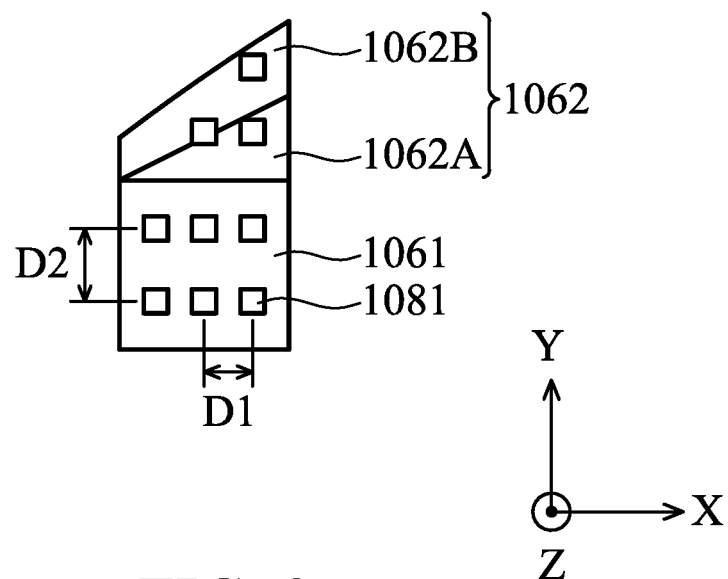
FIG. 9 is a diagram illustrating one edge unit and a first circuit block adjacent to the edge unit.

Please refer to FIG. 9, which is a diagram illustrating one of the edge units 1062 and the adjacent first circuit block 1061 shown in FIG. 8. As shown in FIG. 9, because the area of the second circuit block 1062A of the edge unit 1062 is less than 50% of the area of the adjacent first circuit block 1061, there can be no additional light source disposed on the second circuit block 1062A, and the nine first light sources 1081 corresponding to the first circuit block 1061 can be arranged on the first circuit block 1061, the second circuit block 1062A and the edge portion 1062B, but the arrangement of the first light sources 1081 is not limited to the embodiment. In other embodiments, although the ratio of the area of the second circuit block 1062A to the area of the adjacent first circuit block 1061 varies, the nine first light sources 1081 originally corresponding to the first circuit block 1061 can still be arranged on the first circuit block 1061, the second circuit block 1062A and the edge portion 1062B. In one embodiment, an exemplary arrangement of the first light sources 1081 is shown in FIG. 9. Six first light sources 1081 can be disposed on the first circuit block 1061, and three first light sources 1081 can be disposed on the second circuit block 1062A and the edge portion 1062B. The first circuit block 1061, the second circuit block 1062A and the edge portion 1062B can be arranged along the Y axis. A spacing between two adjacent first light sources 1081 along the X axis is defined as a first spacing D1 (the first spacing D1 is, for example, the distance between the centers of two adjacent first light sources 1081 along the X axis). A spacing between two adjacent first light sources 1081 along the Y axis is defined as a third spacing D2 (the third spacing D2 is, for example, the distance between the centers of two adjacent first light sources 1081 along the Y axis), and the third spacing D2 can be greater than the first spacing D1. In this embodiment, because the nine first light sources 1081 of the first light source group are disposed on the first circuit block 1061, the second circuit block 1062A and the edge portion 1062B, the blocking wall between the first circuit block 1061 and the second circuit block 1062A can be removed.

Figure 10:
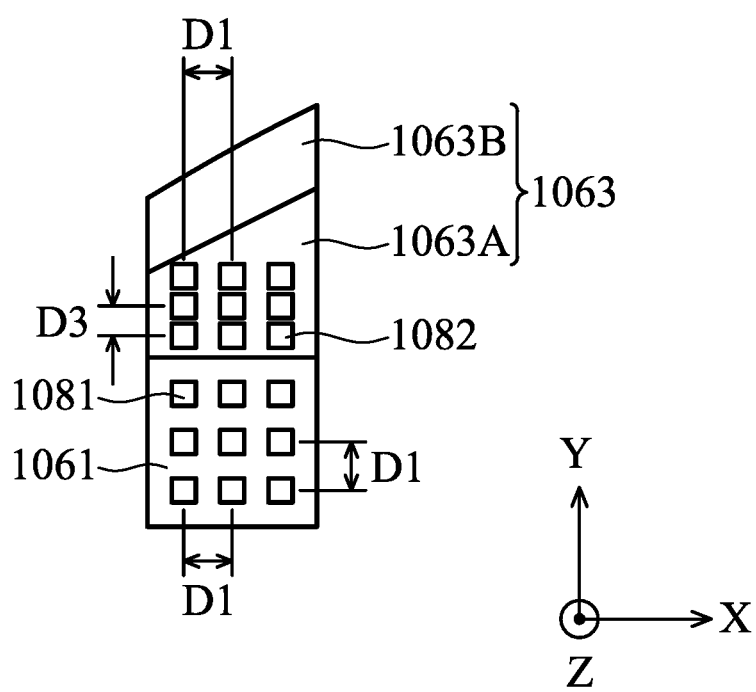
FIG. 10 is a diagram illustrating another edge unit and a first circuit block adjacent to the edge unit.

Please refer to FIG. 10, which is a diagram illustrating the edge unit 1063 and the first circuit block 1061 adjacent to the edge unit 1063 in FIG. 8. As shown in FIG. 10, one of the edge units further include a second light source group which includes a plurality of second light sources 1082. The number of the second light sources 1082 can be equal to the number of the first light sources 1081, but the number of the first light sources 1081 and the number of the second light sources 1082 are not limited to this disclosure. In other embodiment, the number of the second light sources 1082 can be less than the number of the first light sources 1081. In this embodiment, the second light source group includes nine second light sources 1082, and the area of the second circuit block 1063A is greater than 50% of the area of the first circuit block 1061. In this situation, the first light sources 1081 can, for example, be disposed on the first circuit block 1061 with a fixed spacing, and two adjacent first light sources 1081 has the first spacing D1. Furthermore, nine second light sources 1082 are disposed within the second circuit block 1063A, and two adjacent second light sources 1082 can have a second spacing D3 (the second spacing D3 is, for example, the distance between the centers of two adjacent second light sources 1082 along the Y axis). A spacing between two adjacent second light sources 1082 along the X axis is defined as a first spacing D1 (the first spacing D1 is, for example, the distance between the centers of two adjacent second light sources 1082 along the X axis), and the first spacing D1 is different from the second spacing D3. In one embodiment, the first spacing D1 can be greater than the second spacing D3, but it is not limited thereto. It should be noted that there is no light source disposed on the edge portion 1063B. In this embodiment, the blocking wall can be disposed between the first circuit block 1061 and the second circuit block 1063A.

Figure 11:
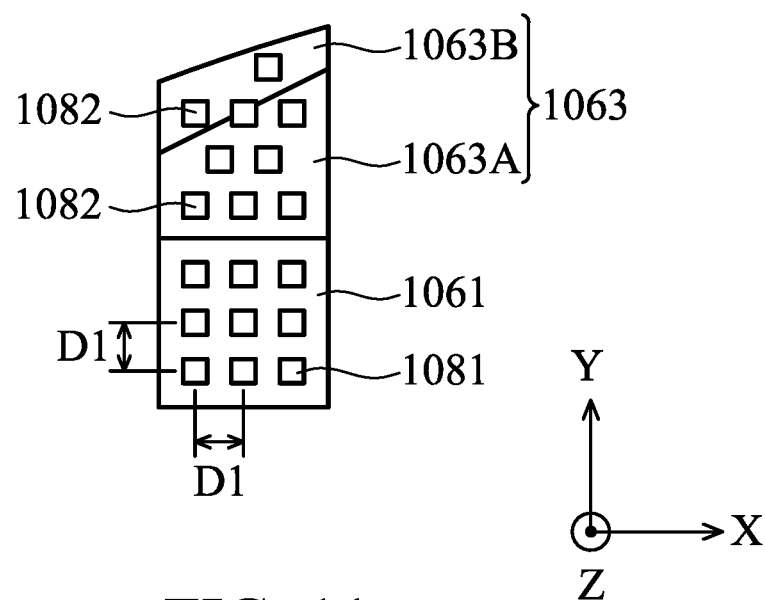
FIG. 11 is a diagram illustrating another edge unit and a first circuit block adjacent to the edge unit.

Please refer to FIG. 11, which is a diagram illustrating the edge unit 1063 and the first circuit block 1061 adjacent to the edge unit 1063 in FIG. 8. The difference between FIG. 11 and FIG. 10 is that the second light sources 1082 are, for example, arranged within the edge unit 1063 in a staggered manner, and the second light sources 1082 can be disposed in the second circuit block 1063A and the edge portion 1063B at the same time. However, the arrangement of the second light sources 1082 can be modified to meet different design requirements. In this embodiment, the blocking wall can be disposed between the first circuit block 1061 and the second circuit block 1063A.

Figure 12:
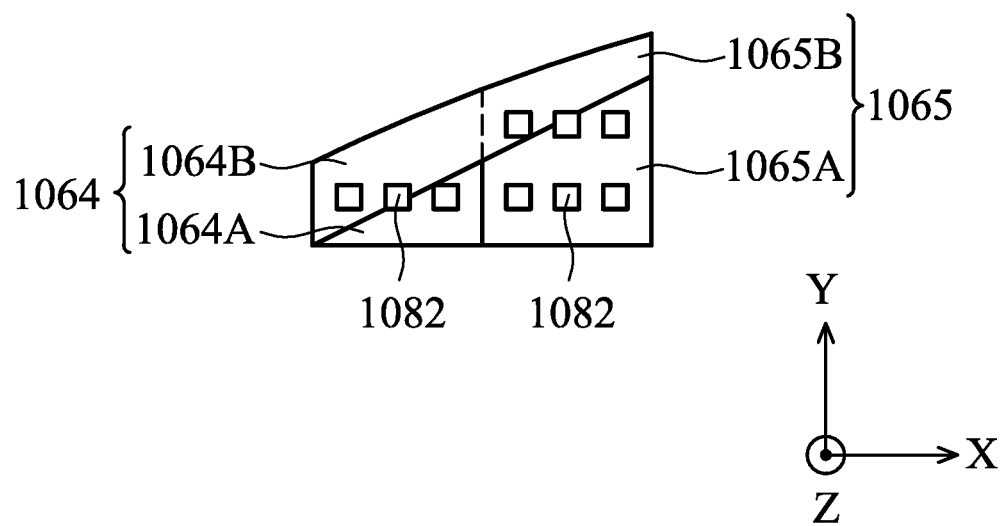
FIG. 12 is a diagram illustrating two adjacent edge units.

In addition to the arrangement of the first light sources 1081 and the second light sources 1082, the first light sources 1081 and the second light sources 1082 can be arranged as shown in FIG. 12. Please refer to FIG. 12, which is a diagram illustrating the edge unit 1064 and the edge unit 1065 adjacent to the edge unit 1064 in FIG. 8. As shown in FIG. 12, the edge unit 1064 is adjacent to the edge unit 1065. In this situation, the second light sources 1082 can, for example, be disposed in the edge unit 1064 and the edge unit 1065 in a stepped manner. As shown in FIG. 12, three second light sources 1082 can be disposed in the edge unit 1064, and six second light sources 1082 can be disposed in the edge unit 1065. Specifically, the second light sources 1082 can be disposed in the second circuit block 1064A, the edge portion 1064B, the second circuit block 1065A and the edge portion 1065B, but the arrangement is not limited to this embodiment. In one embodiment, the second light sources 1082 can be selectively disposed in at least one of the second circuit block 1064A, the edge portion 1064B, the second circuit block 1065A and the edge portion 1065B according to the design requirements, but the arrangement is not limited to this embodiment.

The Seventh Embodiment

Figure 13:
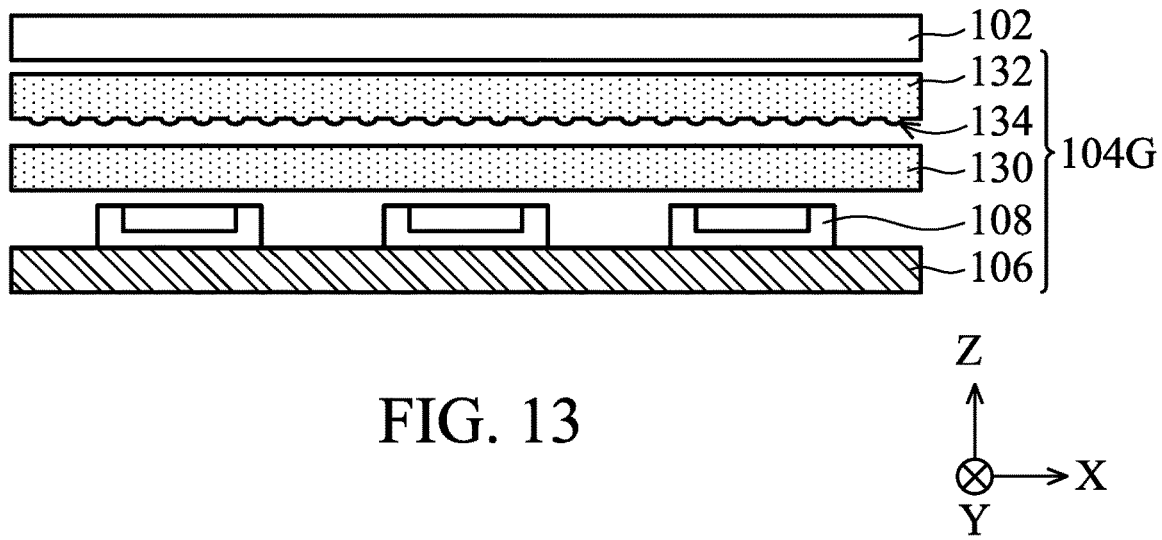
FIG. 13 is a sectional view of a display device which is perpendicular to the XY plane according to the seventh embodiment of the disclosure.

Please refer to FIG. 13, which is a sectional view of a display device 100G which is perpendicular to the XY plane according to the seventh embodiment of the disclosure. As shown in FIG. 13, the display device 100G can include the display unit 102 and a backlight module 104G. The backlight module 104G can be disposed corresponding to the display unit 102, and the backlight module 104G can include the circuit board 106, a plurality of light sources 108, a diffuser plate 130 and an optical film 132. The light sources 108 can be disposed on the circuit board 106, and the diffuser plate 130 can be disposed between the light sources 108 and the display unit 102. The optical film 132 can be disposed between the diffuser plate 130 and the display unit 102, and the surface of the optical film 132 close to the diffuser plate 130 can include a micro-structure 134, and the micro-structure 134 can face the light sources 108. In one embodiment, the micro-structure 134 and the optical film 132 can be integrally formed in one piece, and the micro-structure 134 is disposed on the surface of the optical film 132 which is close to the diffuser plate 130, so as to face the light sources 108. In other embodiments, a layer of material can be coated on the surface of the optical film 132 close to the diffuser plate 130, so as to form the micro-structure 134, but the method of forming the micro-structure 134 is not limited to this embodiment.

Figure 14:
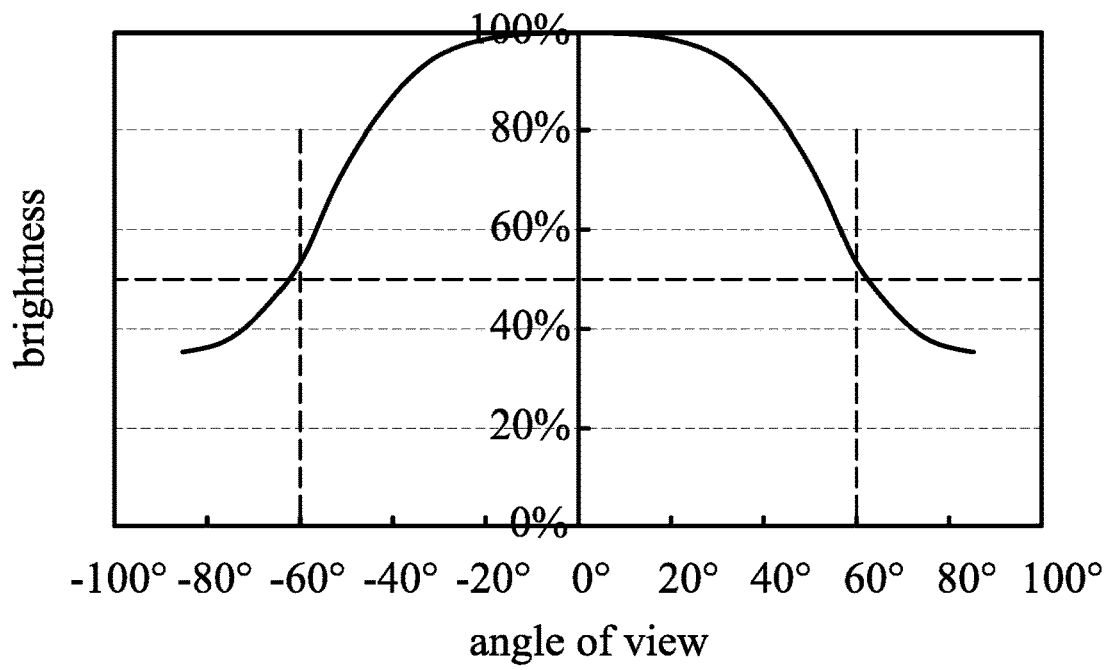
FIG. 14 is a diagram illustrating the relationship between the brightness of the display device and the angle of view according to an embodiment of the disclosure.

In this embodiment, cross-section of FIG. 13 can be a cross-section which is perpendicular to the surface of the optical film 132, or is a cross-section which is parallel to the Z axis. The micro-structure 134 can include a plurality of arc-shaped structures, such as micro-lens structures. The arc-shaped structure can protrude from the surface of the optical film 132 and can face the diffuser plate 130 or the light sources 108. The viewing angle of the display device 100G along some directions can be increased, or the display device 100G has sufficient brightness on a specific angle of view because of the optical film 132 having the micro-structure 134. For example, as shown in FIG. 14, which is a diagram illustrating the relationship between the brightness of the display device and the angle of view according to an embodiment of the disclosure. A user is located on the upper side of the display device 100G and looks at the display device 100G along the −Z axis (FIG. 13), and the line of sight of the user is parallel to the XZ plane. Therefore, the angle of view can be an angle defined by the line of sight of the user and the Z axis on the XZ plane. As shown in FIG. 14, when the angle of view of the user is 60 degrees, the brightness can achieve 50% of the maximum brightness because of the configuration of the optical film 132.

Figure 15:
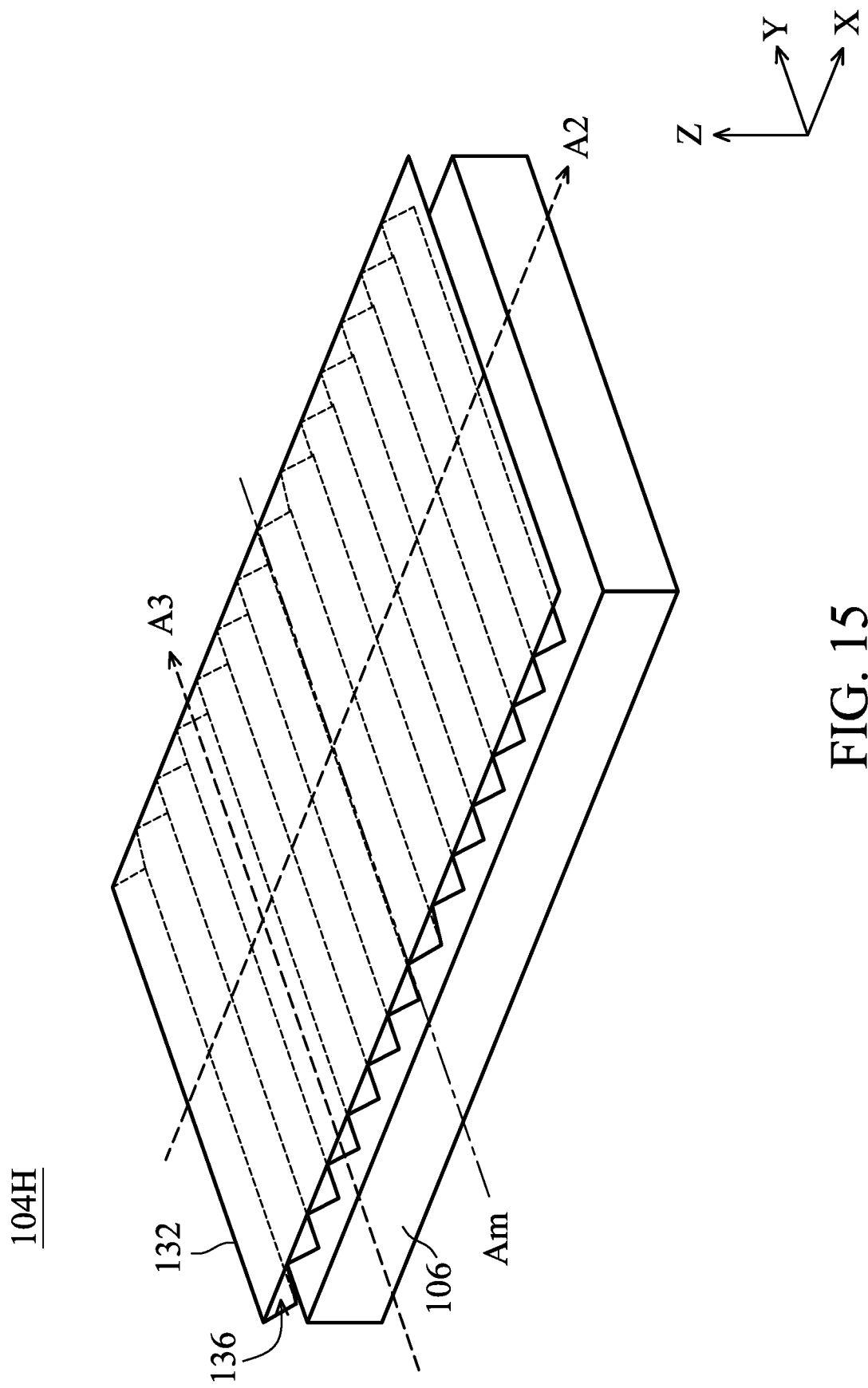
FIG. 15 is a partial structural diagram of a backlight module according to an embodiment of the disclosure.

Please refer to FIG. 15, which is a partial structural diagram of a backlight module 104H according to an embodiment of the disclosure. In this embodiment, the optical film 132 can include a micro-structure 136, and the micro-structure 136 can include a plurality of prism structures. The prism structures can, for example, be long strip triangular structures (as shown in FIG. 15), and the prism structures can protrude from the optical film 132 and face the light sources on the circuit board 106 (not shown in the figures).

It should be noted that the optical film 132 can include a rectangular structure. The rectangular structure can have a long side direction A2 (such as the direction of the X axis in FIG. 15) and a short side direction A3 (such as the direction of the Y axis in FIG. 15), and a longitudinal axis direction Am (such as the direction of the Y axis or an extending line of the prism structures) can be perpendicular to the long side direction A2 of the rectangular structure of the optical film 132, so as to increase the viewing angle of the backlight module 104H. The user is located on the upper side of the backlight module 104H and looks at the backlight module 104H along the −Z axis, and the line of sight of the user is parallel to the XZ plane. Therefore, the angle of view can also be the angle defined by the line of sight of the user and the Z axis on the XZ plane, and the viewing angle can be defined as the maximum angle of view which allows the user clearly watching the display device along the XZ plane. For example, as shown in FIG. 14, when the angle of view of the user is 60 degrees, the brightness can maintained above 50% of the maximum brightness. In another embodiment, the longitudinal axis direction Am can also be perpendicular to the short side direction A3 of the optical film 132, so as to increase the viewing angle of the backlight module 104H. In this embodiment, the line of sight of the user is parallel to the YZ plane, and the angle of view can be the angle defined by the line of sight of the user and the Z axis on the YZ plane. The viewing angle can be defined as the maximum angle of view which allows the user clearly watching the display device along the YZ plane, but it is not limited to this embodiment. In other embodiments, other micro-structure of the optical film or the manner of disposing the micro-structure can be implemented according to the design requirements.

The Eighth Embodiment

Figure 16:
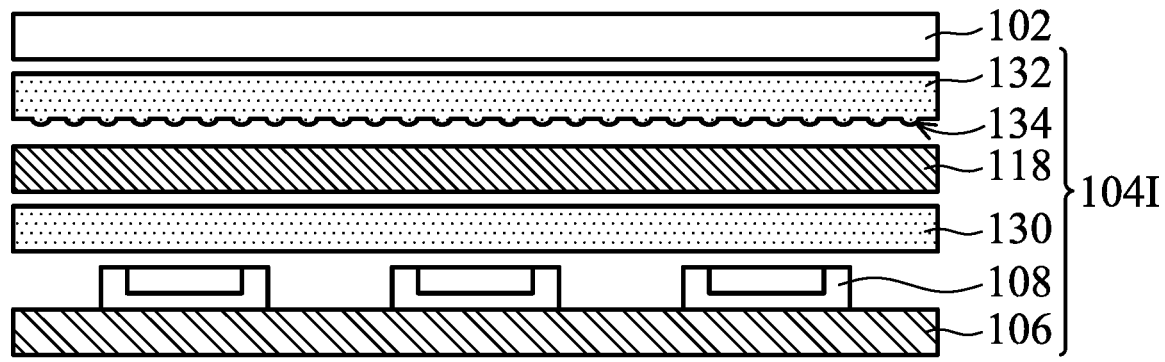
FIG. 16 is a diagram of a display device according to the eighth embodiment of the disclosure.

Please refer to FIG. 16, which is a diagram of a display device 100I according to the eighth embodiment of the disclosure. The structure of the display device 100I disclosed in this embodiment is similar to the structure of the display device 100G disclosed in the seventh embodiment. The difference between the display device 100I and the display device 100G is that the display device 100I of this embodiment can further include the first brightness enhancement film 118 disposed between the diffuser plate 130 and the optical film 132. The brightness of the display device 100I can be increased because of the configuration of the first brightness enhancement film 118. Furthermore, in one embodiment, the display device 100I can also include another brightness enhancement film (not shown in the figures) disposed between the first brightness enhancement film 118 and the optical film 132, so as to increase the brightness of the display device 100I.

The Ninth Embodiment

Figure 17:
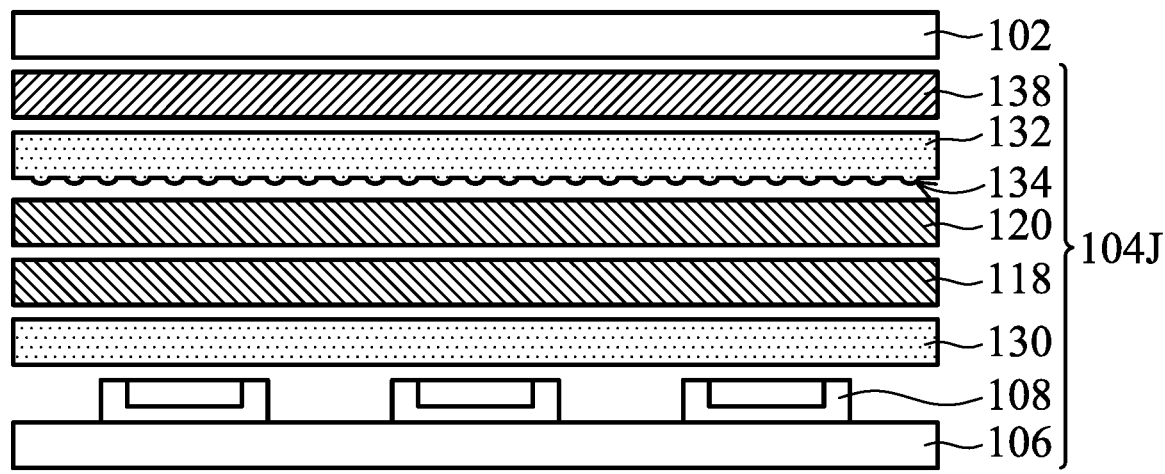
FIG. 17 is a diagram of a display device according to the ninth embodiment of the disclosure.

Please refer to FIG. 17, which is a diagram of a display device 100J according to the ninth embodiment of the disclosure. In contrast to the display device 100I in the eighth embodiment, the display device 100J can further include a second brightness enhancement film 120 and an optical film 138, and the optical film 138 can be a dual brightness enhancement film or a diffuser plate. The second brightness enhancement film 120 can be disposed between the first brightness enhancement film 118 and the optical film 132. Based on the configuration of the first brightness enhancement film 118, the second brightness enhancement film 120 and the optical film 138, the brightness of the display device 100J can be increased or the effect of light-concentrating can be improved.

In conclusion, in the embodiments of the disclosure, the display device includes the display unit and the backlight module. The display device can be a flat panel display, a curved display device or a display device with an irregularly shaped structure (such as a non-rectangular shaped structure). Based on the arrangement of different optical films or the arrangement of the light sources disposed on the circuit board with the irregularly shaped structure, the viewing angle of the display device can be increased, the brightness of the display device can be stronger, or the phenomenon of non-uniform brightness can be prevented from occurring.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A display device, comprising:
a display unit;
a backlight module, disposed corresponding to the display unit, wherein the backlight module comprises:
a circuit board;
a plurality of light sources, disposed on the circuit board;
a first diffuser plate, disposed between the plurality of light sources and the display unit; and
a second diffuser plate, disposed between the first diffuser plate and the display unit;
a first optical film, disposed between the second diffuser plate and the display unit;
a second optical film, disposed between the first optical film and the display unit;
a first brightness enhancement film, disposed between the first optical film and the second optical film;
a second brightness enhancement film, disposed between the first brightness enhancement film and the second optical film; and
a third brightness enhancement film, disposed between the first diffuser plate and the second diffuser plate;
wherein the circuit board comprises at least one radius of curvature, and the radius of curvature ranges from 10 mm to 10000 mm.

2. The display device as claimed in claim 1, wherein the at least one radius of curvature ranges from 50 mm to 7000 mm.

3. The display device as claimed in claim 1, wherein at least one of the plurality of light sources does not have a second lens.

4. The display device as claimed in claim 1, wherein each of the plurality of light sources has a rectangular structure, and a long side direction of the rectangular structure is perpendicular to an extending line of a curved surface of the circuit board.

5. The display device as claimed in claim 1, wherein a distance between two adjacent light sources of the plurality of light sources is defined as a first distance, a distance between the first diffuser plate and the circuit board is defined as a second distance, and a ratio of the first distance to the second distance is 15:10.

6. The display device as claimed in claim 1, wherein at least one of the first diffuser plate and the second diffuser plate is a micro-lens diffuser plate.

\* \* \* \* \*